Oct. 1, 1957 F. H. RAYMOND ET AL 2,808,205

ELECTRIC ADDER-SUBTRACTOR DEVICES

Filed Nov. 26, 1951 2 Sheets-Sheet 1

INVENTORS
FRANÇOIS HENRI RAYMOND
ROGER ROBERT DUSSINE
BY
Reed Hayes
ATTORNEY

ELECTRIC ADDER-SUBTRACTOR DEVICES

Filed Nov. 26, 1951 2 Sheets-Sheet 2

INVENTORS
FRANÇOIS HENRI RAYMOND
ROGER ROBERT DUSSINE
BY
Theodore Stafford
ATTORNEY

United States Patent Office 2,808,205
Patented Oct. 1, 1957

2,808,205

ELECTRIC ADDER-SUBTRACTOR DEVICES

François Henri Raymond, Le Vésinet, and Roger Robert Dussine, Paris, France, assignors to Societe d'Electronique et d'Automatisme, Courbevoie, France Application November 26, 1951, Serial No. 258,202

Claims priority, application France December 7, 1950

18 Claims. (Cl. 235—61)

The present invention relates to electric adders and subtractors of two numerical quantities represented by trains of electrical pulses which may be regarded as consisting of a number of consecutive pulse moments of code (i. e. short intervals of time during each of which an electrical pulse can occur), each train reproducing the binary-scale expansion of a numerical quantity into a series of the form $$a_0+a_1.2+a_2.2^2+\ldots+a_n.2^n+\ldots$$

in which the successive moments of code of the train in their order of occurrence respectively denote the terms of this series read from left to right, i. e. in the sequence of increasing orders 0, 1, 2, . . ., $n$, . . . or powers 1, 2, $2^2$, . . ., $2^n$, . . . of these terms, while the presence or absence of an impulse in any one of the moments of code of the train denotes a value (which can only be either 1 or 0) of the coefficient or digit $a$ of the particular term denoted by that moment of code.

An object of the invention is to provide improved electric adders and subtractors of this kind which progressively derive from the simultaneous reception of both trains of electric pulses representing the numerical quantities to be added or subtracted a coded output train of similar sequence of moments of code which represents the "net" result of operation, carry-over corrections having automatically taken place concurrently with the adding or subtracting operation of the terms of same order or power in both of said pulse coded trains.

Whenever a numerical quantity B must be added to, or subtracted from a second numerical quantity A, it is clear that the carries form a third numerical quantity R. This third numerical quantity must, in a general way, be considered as a quantity which has to be added to the numerical quantity B in correspondence of their respective terms.

In adders and subtractors operating from the reception of coded trains of electrical pulses of the kind specified, the third numerical quantity R shall be represented by a third coded train of pulses, formed as the addition or subtraction operation progresses, and concurrently with the formation of the coded train of pulses representing the net result of the addition or subtraction operation in progress.

When effecting terms by terms such operations on numerical quantities expressed in the binary system of numeration, there is only a small number of alternatives to decide whether a pulse (representing the binary number 1) shall be present in the output coded train of pulses and/or in the carry coded train of pulses or whether no pulse, (representing the binary number 0) shall exist in the one and/or the other of these trains, according whether one, two or three pulses coexist at a moment of code in the B, A and R trains. A total lack of pulses at a moment of code in these trains clearly means that no pulses shall be present, for this moment of code, in both the output and carry trains.

These alternatives can be stated according ot the following table:

| Operation of | | | | Addition | | Subtraction | |
|---|---|---|---|---|---|---|---|
| Digits of | B | R | A | $S_a$ | $R_a$ | $S_s$ | $R_s$ |
| | 0 | 0 | 0 | 0 | 0 | 0 | 0 |
| | 0 | 0 | 1 | 1 | 0 | 1 | 0 |
| | 0 | 1 | 0 | 1 | 0 | 1 | 1 |
| | 0 | 1 | 1 | 0 | 1 | 0 | 0 |
| | 1 | 0 | 0 | 1 | 0 | 1 | 1 |
| | 1 | 1 | 0 | 0 | 1 | 0 | 1 |
| | 1 | 0 | 1 | 0 | 1 | 0 | 0 |
| | 1 | 1 | 1 | 1 | 1 | 1 | 1 |

Such operating rules are independent of the true configuration of the coded trains B and A from which the addition or subtraction process is to be directed. The identity of the columns $S_a$ and $S_s$, respectively relating to the digits caused to appear in the output sum and difference trains, is to be noted.

Now another object of the invention is to provide devices for the addition and the subtraction of two numerical quantities given in the binary system of numeration and represented by means of two phased trains of pulses having their moments of code in the sequence of increasing orders; these devices operate for developing output and carry trains of pulses in accordance with the above-given table.

Another object of the invention is to provide adder-subtractor devices of such a kind in which the pulses to complement in the output and carry trains are taken from an auxiliary voltage source, without mixing the pulses of the trains representing the numerical quantities to be added or subtracted and the carry-over train.

Broadly speaking, the invention provides adder-subtractor devices comprising in combination a four stage matrix of on-off switch contacts for selectively directing voltage applied on the input of the first stage to a first output connected to the third and/or to a second output also connected to said third stage and conditionally connected over the fourth stage to outputs from said third stage also connected to the first output, a quartet of control units respectively controlling the on-off condition of said four stages, each of said control units being operable from a binary zero condition to a binary one condition in response to an input voltage and being operative in turn for actuating the controlled contact stage from a off-condition to an on-condition, means for receiving the two incoming coded trains and for applying them to the inputs of two of the three first control unit, means for delaying the output signal from said second output and receiving it and applying it on the input of the other of said three first stage controlling units, and means for applying on the input of the fourth control unit an actuation voltage during the complete time interval pulse trains are received on the inputs of the three first control units according to the sign of the wanted arithmetical operation in process.

In a preferred embodiment, further, the invention provides a matrix of on-off switch contacts in the form of a matrix of nonlinear elements such as crystal rectifiers tapped or branched off conductors carrying the above mentioned voltage, and also control units in the form of inertialess vacuum tube circuits so controlled as to ensure a selective grounding of said non-linear elements.

These and other objects of the invention will be more fully described, with reference to the accompanying drawings, in which.

Figures 1, 2:
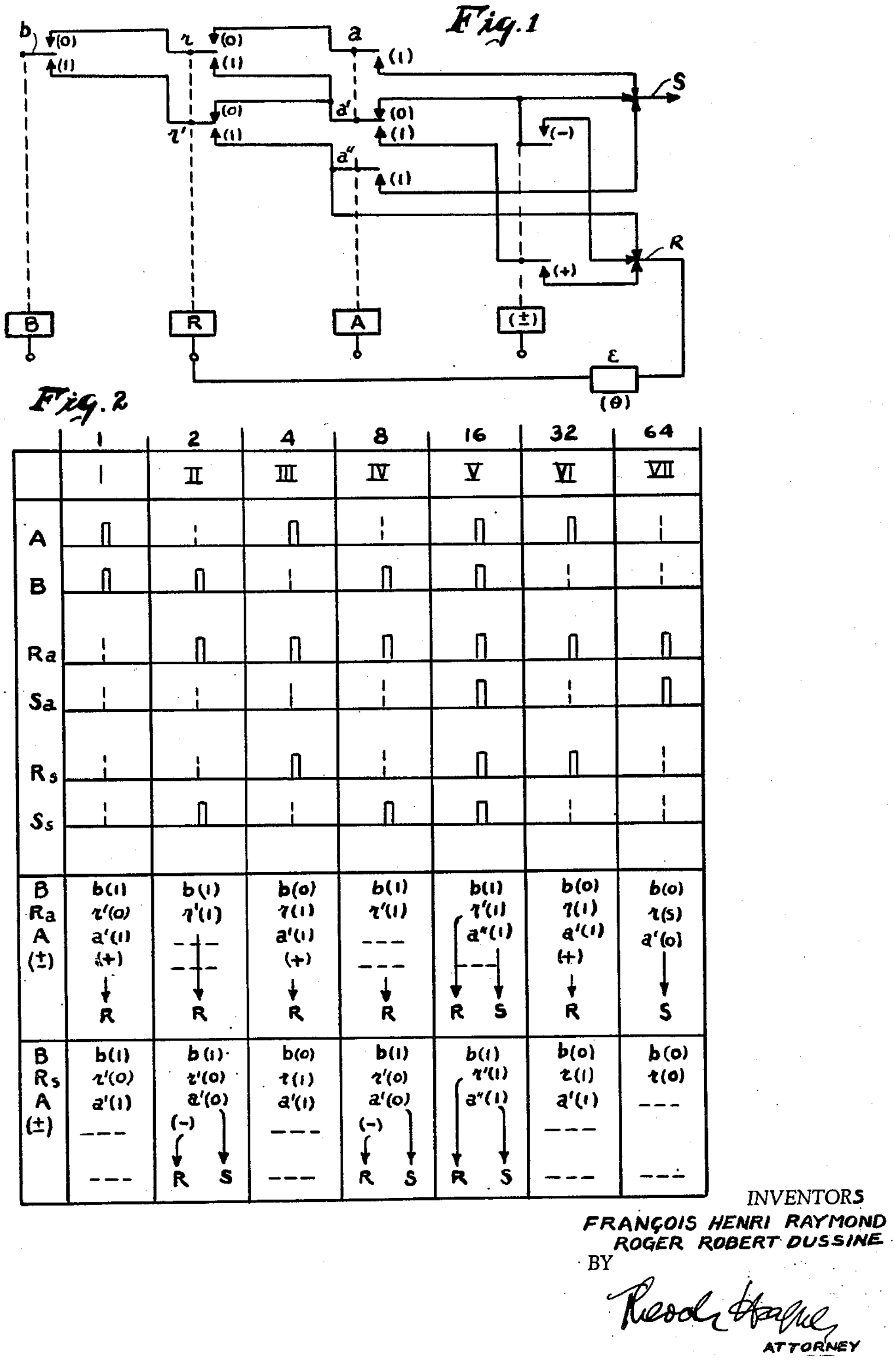
Fig. 1 shows the general arrangement of an adder-subtractor device according to the invention.
Fig. 2 shows a timing diagram for the arrangement of Fig. 1, which will also serve to explain of operation of the device shown in Fig. 3.

Referring now to Fig. 1, references B, R, A and (+) designate four units operable either to a binary one or a binary zero condition, the definite nature of which will be disclosed later. Unit B receives the coded train of pulses representing the augend or the subtrahend, unit A receives the coded train of pulses representing the addend or the minuend, unit R receives the coded train of pulses representing the carry, and unit (+) receives a voltage representing the sign of the operation which is to be conducted, in its algebraic significance.

These four units control the condition of on-off switching contacts: switch contact $b$ is controlled by the B-unit; switch contacts $r$ and $r'$ are controlled by the R-unit; switch contacts $a$, $a'$ and $a''$ are controlled by the A-unit, and switch contacts (+) and (−) are controlled by the (+)-unit. Contacts $b$, $r$, $r'$, $a'$ are inverter contacts whereas contacts $a$, $a''$, (+) and (−) are interrupter contacts.

In Fig. 1, further, the contacts which are closed or made when the control units are in their binary zero condition are marked (0); similarly, the contacts which are closed or made when the control units are in their binary one condition are marked (1).

Contacts $a(1)$, $a'(0)$ and $a''(1)$ are all connected to a common output channel S. Contacts $r'(1)$, (+) and (−) are all connected to a common carry channel R, which is connected back to the input of the R-unit over a transmission path incorporating a delay element; over this delay can be small or it can preferably be taken equal to the time duration $\theta$ of a moment of code.

On the armature of switch contact $b$ there is applied an electrical voltage. Contact $b(0)$ to the armature of the switch contact $r$; contact $b(1)$ to the armature of the switch contact $r'$. Contact $r(0)$ is connected to the armature of the switch contact $a$; contacts $r(1)$ and $r'(0)$ are both connected to the armature of the switch contact $a'$. Contact $r'(1)$ is connected to both the armature of contact $a''$ and to the input of the carry channel R. Contact $a'(0)$ is connected to both the input of the output channel S and the armature of contact (−). Contact $a'(1)$ is connected to the armature of contact (+).

It is first assumed that the B, R, A and (±) units are relay coils, said coils being energised to simulate the binary one condition and unenergised to simulate the binary zero condition; all contacts in condition (1) and (+) indicate the binary one values of the moments of code for the case of an addition; all contacts in condition (0) and (−) indicate the binary zero values of the moments of code for the case of a subtraction; it is possible to verify that the disclosed arrangement satisfies the operative conditions given in the above table, either for an addition or for a subtraction process.

Fig. 2 illustratively shows the successive conditions of an arrangement according to Fig. 1. The moments of code are indicated from I to VII and their binary digital values are written from 1 to 64. The incoming coded train A represents the numerical quantity 53; the incoming coded train B represents the numerical quantity 27. The output trains respectively representing the sum $S_a$, and the difference $S_s$, clearly indicate the numerical quantities 80 and 26. The carry trains for addition, $R_a$, and subtraction, $R_s$, are plotted after the pulses from the output R have been delayed by the duration $\theta$ of a moment of code; after that delay they are applied to the R-unit in Fig. 1.

In an addition process, at the first moment of code, the following contacts are closed in cascade connection: contact $b(1)$ since the coded train B presents a pulse at said first moment of code I; $r'(0)$ since no pulse appears in the carry train; $a'(1)$ since the coded train A presents a pulse, and (+) since it is an operation of addition. The voltage applied on the armature of $b$ is thus directed to the carry output R, which will cause a carry-over pulse to be applied on the unit R at the second moment of code II.

At that moment of code II, contact $b(1)$ is closed since a pulse exists in the B train; contact $r'(1)$ is also closed since the R-unit is energized, and through said latter contact, the voltage applied on $b$ is applied to the carry output. No pulse is transmitted to the sum output S, because there is no pulse at the first moment of code, and there are no closed contacts leading to said output.

The sequence of formation of the carry and sum coded trains can be followed on the diagram of Fig. 2, where the contacts starting operation at each moment of code are given, for each column indicating the number of the moment of code, in the one before last row for addition process, and in the last row for the subtraction process, according to whether the (±) unit is on or off.

In actual practice, it is without importance whether the voltage applied on $b$ be a permanent or a pulse voltage: output channels S and R will always be operated by a pulse train with pulses having either a duration equal to that of a complete moment of code or a duration equal to that of the pulses applied at $b$. In the first case, short pulses can always be regenerated from long pulses, by a well-known gating means which comprises a multi-grid, preferably a pentode vacuum tube, one grid of which, for instance the suppressor grid, receives clock or timing pulses unblocking said vacuum tube which only sends an output pulse when its control grid is driven positive by pulses or by a permanent voltage applied thereto.

In actual practice, furthermore electro-mechanical relays cannot be used in high-speed computers. It is thus necessary to have recourse to electronic relays: as well-known, a switch contact relay can be replaced by a gate controlled from a bi-stable trigger stage. In such a gating arrangement, one tube at least receives the voltage to pass on its control grid and a control voltage on one of its other grids, screen or suppressor, the latter voltage being derived from the plate element of a bi-stable trigger stage comprising two reciprocally coupled tubes; an input of one of these tubes receives the control pulses; here the coded pulses and the input of the other tube receives a sequence of resetting pulses of the same frequency as that of the moments of code of the actuating pulses.

The incorporation of such gating arrangements in a device such as shown in Fig. 1 clearly necessitates certain duplications of the connection leads as a gated tube cannot replace by itself an inverter switch but it can replace an interrupter switch. However, from the point of view of the electronic art, the conversion of design is familiar to anybody skilled in the art.

Now, the introduction of trigger stages of a conventional kind may introduce an unwanted limitation of efficiency because such a trigger stage, uses a definite time interval to shift one of its stability conditions to the other. For this reason, a progressive phase-shift is provided for the application of the coded pulse trains B, R and A on their respective control units, which is clearly a drawback.

In order to avoid said drawback, and obtain a simple embodiment of the arrangement of Fig. 1, without changing its operation at all, the invention further provides complementary features which will now be described in relation to the all-electric circuit of Fig. 3, without however limiting the practical design of the circuit. A first feature is in the choice of unilateral impedance elements, such as crystal rectifiers, of the so-called germanium type for instance, which are branched off the electric connections carrying the voltage to be directed to the S and R outputs; the grounding of any one of these crystal derivations is equivalent to an opening of any one of the switch contacts of a design, and vice-versa. A second feature is the provision of control units for these grounding actions which when actuated by the incoming pulses and voltages, are inertialess and do not present any time delay constant for operation.

Figure 3:
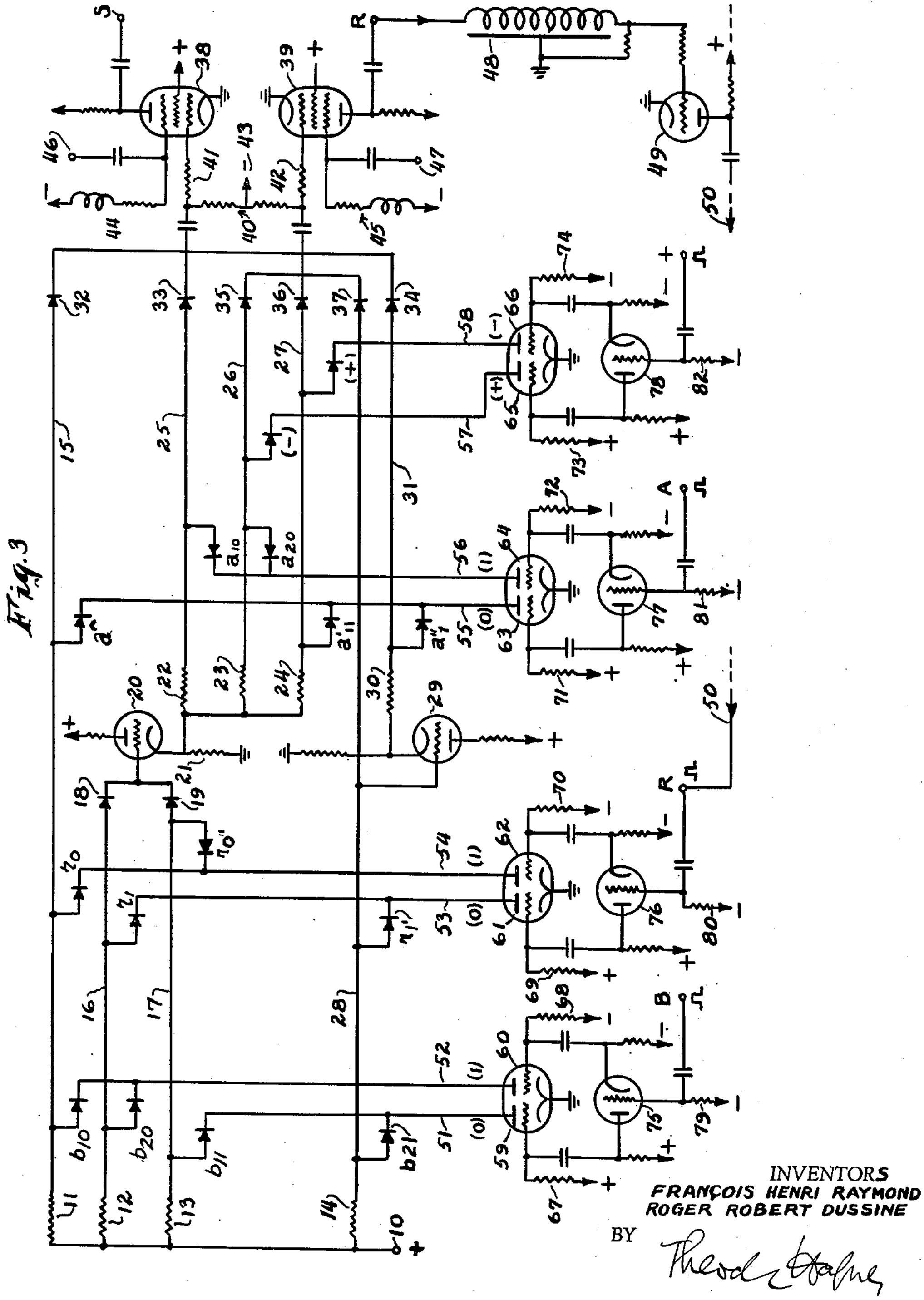
Fig. 3 shows a preferred embodiment of an adder-subtractor device according to the present invention.

In Fig. 3 positive, a D. C. voltage is applied to the input terminal 10 of a matrix of four paralleled resistors 11, 12, 13 and 14, thus ensuring a star-distribution of said voltage to conductors 15, 16, 17 and 28, respectively, at equal amplitude levels.

From conductor 15, there are branched off the crystal rectifiers denoted $b_{10}$, $r_0$ and $a_1$. From conductor 16, there are branched off the rectifiers $b_{20}$ and $r_1$. From conductor 17, there are branched off the detectors $b_{11}$ and $r'_0$. From conductor 28, there are similarly branched off the rectifiers $b_{21}$ and $r'_1$.

The designations of the rectifiers in Fig. 3 are so chosen as to show the correspondence of these elements with the switch contacts in Fig. 1. For instance, crystal rectifiers $b_{10}$ and $b_{20}$ correspond to the switch contact $b(0)$ which is duplicated in the scheme of Fig. 3, etc.

Conductors 16 and 17, through unilateral impedance elements (which can also be crystal rectifiers) 18 and 19, respectively, are both connected to the control grid of a vacuum tube 20. Said tube is mounted to provide a cathode follower stage; its cathode output 21 feeds an auxiliary starred network comprising the three resistors 22, 23 and 24. The polarity of the translated voltage is thus preserved and the cathode output maintains, as well-known, a low impedance for further connections.

Resistors 22, 23 and 24 are connected respectively to conductors 25, 26 and 27. From conductor 25, there is branced off a rectifier $a'_{10}$; from conductor 26 there are branched off the rectifiers $a'_{20}$ and (—), and from conductor 27 there are branched off the rectifiers $a'_{11}$ and (+).

From conductor 28, there also is a derivation through a cathode follower stage 29. The cathode output of said stage is fed, through resistor 30, to a conductor 31 from which a rectifier $a''_1$ is branched off.

The ends of conductors 15, 25 and 31 are connected through unilateral impedance elements 32, 33 and 34 respectively, to a common point which, through a capacitive connection, is brought to the control grid of an output gating stage 38. At 41 there is shown a series resistor in said connection and the bias voltage from 43 is applied to the control grid through the half of potentiometer 40. Said bias voltage is so adjusted that the tube 38 is nonconductive, or in its off-condition, when no voltage is applied from conductors 15, 25 and 31. Tube 38 will be unblocked each time a positive voltage variation appears on one of said conductors.

The output stage 38 is further gated through an overly negative bias applied on its suppressor grid through a series network comprising a choke coil and a resistor, a periodical pulse positive voltage being also applied to said suppressor grid through terminal 46. This pulse voltage will thus ensure a periodical unblocking of the gating stage which will transmit an output pulse each time a positive voltage change occurs on its control grid in phased relation with said pulse voltage on its suppressor grid. Said output gate will deliver the pulses of the coded sum (or difference) train to the outgoing channel S.

Conductors 26, 27 and 28 are also connected, through respective unilateral impedance elements 35, 36 and 37, to a common point which, by a capacitive connection comprising also a series resistor 42, is connected to the control grid of a second output gate stage 39. The control grid bias from potentiometer 40 normally places tube 39 in its off-condition when no voltage change of positive polarity appears at said common point. By means of an overly negative bias through network 45 on its suppressor grid, tube 39 is also off during the intervals of application of positive pulses at terminal 47 on said suppressor grid; the operation of gate circuit 39 is similar to that of gate circuit 38.

The output R from tube 39, of negative polarity, is first delayed by $\theta$, the interval between pulses in the coded trains concerned, by means of the artificial delay section 48; the output from said delay section has its polarity reverted through an inverter stage 49, and is then applied on the input of same reference R of the R-control unit of the device.

The B, R, A and (±) control units comprise each a double triode vacuum tube, both triode elements having a common cathode connected to ground. One of said triode elements is maintained conductive or "on" with no input signal, by means of a positive bias on its control grid; the other is maintained non conductive or "off" by means of a negative bias on its own control grid. The plates of the triode elements which are "on" in the rest condition of the device are connected to the crystal rectifiers which are designated by references having the digit 1 in the last position of their indices: triode element 59 is connected through conductor 51 to rectifiers $b_{11}$ and $b_{21}$, thus grounding conductors 17 and 28; triode element 61 through conductor 53 is connected to rectifiers $r_1$ and $r'_1$, thus grounding conductors 16 and 28; triode element 63 through conductor 55 is connected to rectifiers $a_1$, $a'_{11}$ and $a''_1$, thus grounding conductors 15, 27 and 31; and triode element 65 through conductor 57 is connected to rectifier (—), thus grounding conductor 26 (the device is then operating as an adder).

In a reciprocal way, the plates of the triode elements which are "off" with no input signal—general rest condition of the device—are connected to those rectifiers whose designation comprises the number 0 at the last position of their indices: triode element 60, paired to triode element 59, is connected through conductor 52 to rectifiers $b_{10}$ and $b_{20}$; hence voltage is maintained on conductors 15 and 16, i. e. must of course be maintained if any of the above-mentioned groundings were not otherwise applied. Triode element 62, paired to triode element 61, is connected through conductor 54 to rectifiers $r_0$ and $r'_0$; hence voltage is maintained on conductors 15 and 17. Triode element 64, paired to triode element 63, is connected through conductor 56 to rectifiers $a'_{10}$ and $a'_{20}$; hence voltage is maintained on conductors 25 and 26. Triode element 66, paired to triode element 65, is connected through conductor 58 to rectifier (+); hence voltage is maintained on conductor 27.

It is easy to check that, either for an addition or for a subtraction, as determined by the condition of the (±)-unit, all outputs towards the final gates present a ground potential, one of the rectifiers at least grounding each one of the conductors 15, 25, 31 and 26, 27, 28: for instance, rectifier $a_1$ grounds conductor 15, rectifier $r_1$ grounds conductor 16, a. s. o.

In the general rest condition of the device, triode elements 59, 61, 63 and 65 are maintained "on" by positive biassing through respective resistors 67, 69, 71 and 73, triode elements 60, 62, 64 and 66 are maintained "off" by negative biassing through respective resistors 68, 70, 72 and 74.

Any control unit has its condition reversed when a positive pulse arrives on its input terminal. On terminal (±), a permanent voltage can be applied as an actuation signal during a complete subtraction process. Taking for instance the B input, a positive pulse will be applied to the control grid of a triode 75. By its plate output, said transfer triode 75 then applies a negative voltage pulse on the control grid of triode element 59, which is thus put "off." By its cathode output, transfer stage 75 applies a positive pulse voltage on the control grid of triode element 60 which is thus put "on." The action of such a control unit is quite instantaneous and presents no material delay. The transfer triode of the R-unit is shown at 76, that of the A-unit at 77 and finally that of the (±)-unit at 78. These transfer triodes are, at rest, not conductive, being negatively biassed through their control grid resistors 79, 80, 81 and 82.

The illustrative numerical example of Fig. 2 can be repeated for the device of Fig. 3: in the overall rest condition, before any coded trains A and B are applied, corresponds to that of the circuit in Fig. 1. Armatures of switches *b*, *r*, *r'*; *a* are, *a'* and *a''* in the binary zero position, contact (+) is closed; no voltage output exists on gates 38 and 39. At the first moment of code, I, a pulse of the incoming coded train B is applied as well as a pulse of the incoming coded train A. The B pulse switches triode element 60 "on," and triode element 59 "off." Conductors 15 and 16 are grounded but conductors 17 and 28 are separated from the ground in the first directive stage. However, ground is maintained on conductor 28 by the triode element 61 of the R-unit, at rest. The voltage on conductor 17 is transferred by the cathode follower stage 20 (which can be dispensed with without exceeding the scope of the invention); to conductors 25, 26 and 27. The A pulse switches triode element 64 "on" and triode element 63 "off"; conductors 25 and 26 are grounded but conductor 27 remains ungrounded due to the rest condition of the (±)-unit in an addition process. Thus the voltage from terminal 10 is directed through conductors 17 and 27 to the carry output gate 39 (contacts $b_{11}$, $r'_0$, $a'_{11}$ and (+), being "closed").

At the second moment of code, an incoming pulse from B is applied to the B-unit, and a carry pulse reaches the input of the R-unit. The B pulse ungrounds conductors 17 and 28. The R pulse grounds conductor 17 and ungrounds conductor 28. The voltage from 10 is transferred by said conductor to the input of the carry gate 39. Conductor 31 is maintained grounded by the triode element 63, no A pulse existing at that moment II of code in the A coded train. A similar process exists for each of the moments of code, in accordance with the diagram of Fig. 2, for an addition as well as for a subtraction: for instance, at the IV moment of code, for subtraction, only the B input is actuated, ungrounding conductor 17, the voltage of which is transferred by the cathode follower stage 20 to both conductors 25 and 26 which are ungrounded at this moment of code; thus an output pulse from conductor 25 is applied on the difference output gate 38 and, simultaneously, a carry pulse is applied by the conductor 26 on the carry output gate 39, because rectifier (—) is, in a subtraction process, connected to the plate of a triode element, 65, which is "off."

The ranks of the B, R and A control units in arrangements according to the present invention may be chosen different from those shown without exceeding the scope of this invention. In the illustrated case, it is apparent, however, that the given order leads to a simpler interconnection of contacts, which themselves are a minimum.

Having now fully described and ascertained our invention, we declare that we claim:

1. In combination, a four stage matrix of switching means comprising double throw switching means in the three first stages for selectively directing a voltage applied at the input of the first stage switching means over second and third stage switching means to a first output connected to switching means of the third stage, and also over second stage switching means to a second output connected to switching means of the second stage; and single throw switching means in the fourth stage for selectively also directing said voltage after having passed said third stage switching means to said second output, a group of four control units each of which being operable from a binary zero to a binary one condition in response to an actuation voltage and being operative for actuating respectively the switching means in each stage of said four stages from an off-condition to an on-condition means for receiving two incoming coded trains of number representative pulses and for applying them respectively to the inputs of two of the three first of said control units, means for delaying the output signal from said second output and for receiving it on the input of the other of said three first control units, and means for applying on the input of the fourth control unit on actuation voltage lasting the complete time interval during which said incoming and received pulse trains are applied respectively on the inputs of said first three control units.

2. An adder-subtracter device of numerical quantities expressed in the binary system of numeration, comprising in combination a four stage matrix of switching means, the first stage switching means including an armature receiving an arbitrary voltage, cooperating with on and off contacts, the second stage switching means including two armatures and respectively connected to the on and off contacts of the first stage, the third stage switching means including an armature cooperating with single on contacts; and two more armatures cooperating with single on and off contacts respectively, the on contact of the second stage armature that is connected to the off contact of the first stage and the off contact of the second stage armature that is connected to the on contact of the first stage, being connected in common to the first armature of the third stage; the other off and on contacts of the second stage armature being respectively connected to the two other armatures of the third stage; a first output terminal connected in common to the single on contacts of the third stage, and also connected to the off contact of the third stage, a second output terminal connected to the on contact of the second stage armature that is connected to the on contact of the first stage, and also connected respectively to the on and off contacts of the fourth stage, the fourth stage switching means having two armatures respectively connected to the off and on contacts of the third stage, a quartet of control units operable from a binary zero condition to a binary one condition in response to an input binary one condition voltage, each of said units controlling the actuation of the switching means of one of the stages of said matrix, a delayed feedback connection from the second output terminal to the actuation input of the second stage control unit, means for applying incoming coded trains of binary number representative pulses on the respective inputs of the first stage and the third stage control units, and means for applying an algebraic sign representative voltage on the actuation input of the fourth stage control unit during the complete time interval during which said incoming and delayed trains are applied on the inputs of said three first control units.

3. In combination, a paralleled arrangement of electrical conductors comprising a first group of four commoned conductors; two conductors of said first group being connected in common to control a second group of three further conductors also connected in common; a third conductor of said first group being connected to a third group of two commoned conductors, a first output terminal to which there are connected the remaining conductor of said first group of conductors and one conductor of the two other groups of commoned conductors, and a second output terminal to which there are connected the remaining three conductors of said two other groups of commoned conductors, a four stage matrix of on-off crystal rectifier switches and actuation leads connected to said conductors, the first stage of said matrix comprising four crystal rectifiers branched off the conductors of said first group and the second stage also comprising four crystal rectifiers branched off the conductors of said first group, said first and second stage crystal rectifiers being connected by pairs in each stage to pairs of actuation leads, whereby the crystal rectifiers branched off the two first group conductors connected in common are paired with crystal rectifiers connected to the other two first group conductors, the third stage comprising three crystal rectifiers connected to one actuation lead, and two crystal rectifiers connected to another actuation lead, said three crystal rectifiers in said third stage being respectively branched off that one of the first group connected to the first output terminal, that one of the third group connected to the first output terminal, and one of the second group connected to the second output terminal; and said two crystal rectifiers in said third stage being respectively branched off the other two conductors of said second group, and the fourth stage comprising a pair of crystal rectifiers respectively connected to a pair of actuation leads and respectively branched off the two conductors of said second group connected to said second output terminal; a quartet of control units operable from a binary zero condition to a binary one condition, each of said control units feeding a respective pair of said actuation leads and switching a ground potential from one lead to the other lead of the pair, a delayed feedback connection from the second output terminal to the actuation input of the second control unit of said quartet of control units, means for applying incoming coded trains of binary number representative pulses on the respective actuation inputs of the first and of the third of said control units, and means for applying during the complete time interval in which said first three units are receiving pulse trains, an algebraic sign representative voltage on the actuation input of the fourth stage control unit.

4. An adder-subtractor device of binary numerical quantities, comprising in combination a first group of four commoned conductors, two of which are connected in common to control a second group of three conductors, and another one of which is connected to a pair of further commoned conductors, an input terminal for applying an electric voltage to said first group of conductors, a first output terminal for said voltage, to which there are connected the singled conductor of said first group, one of the conductors of said second group and one of said pair of commoned conductors, a timed pulse amplitude gated stage connected to said first output terminal, a second output terminal for said voltage, to which there are connected the remaining two conductors of said second group and the remaining conductor of said pair of commoned conductors, a timed pulse amplitude gated stage connected to said second output terminal, a delayed transmission channel connected to the output of said second gated stage, a group of four control units operable from a binary zero to a binary one condition in response to a binary one representative voltage, a pair of output leads from each one of said control units, one lead of said pairs being at the ground potential while the other is at an operative potential, three crystal rectifiers branched off the singled conductor of said first group, two of said three crystal rectifiers being connected to operative potential leads and one to a ground potential lead of three of said group of control units, respectively, two crystal rectifiers branched off that conductor of said first group which is further connected to said pair of commoned conductors, and connected to the ground potential leads of the two first of said group of control units, and two crystal rectifiers branched off another one of said first group of conductors, and connected respectively to a ground potential lead and to an operative potential lead of said first two control units, said connection being reversed from one of said control units to the other for the one remaining conductor of said first group of conductors, a crystal rectifier branched off the conductor of said second group which is connected to the first output terminal, and connected to the operative potential lead of the third of said control units, and another crystal rectifier also connected to said lead and branched off one of the two conductors of said second group connected to said second output terminal, another crystal rectifier branched off said latter conductor and connected to the ground potential lead of the fourth of said control units, a crystal rectifier connected to the ground potential lead of the third control unit, and a crystal rectifier connected to the operative potential lead of the fourth control unit branched off the remaining conductor of said second group and a crystal rectifier connected to the ground potential lead from said third control unit branched off that one of said pair of commoned conductors which is connected to the first output terminal, means for connecting said delayed transmission channel from the second output terminal to the actuation input of the second of said control units, means for receiving and applying incoming coded trains of binary number representative pulses onto the respective actuation inputs of the first and the third of said control units, and means for applying on the actuation input of said fourth control unit an actuation voltage representative of the sign of the subtraction process.

5. An adder-subtractor device according to claim 4, wherein each of said control units comprises a vacuum tube including a twin triode with a common grounded cathode, a positive bias on the triode element the plate of which is connected to the ground potential lead at rest, and a negative bias on the triode element the plate of which is connected to the operative potential lead at rest, another vacuum tube having its plate connected to the control grid of the triode which is conductive at rest and its cathode connected to the control grid of the triode which is nonconductive at rest, and means for applying the binary one incoming signals in positive polarity on the control grid of said other vacuum tube.

6. In combination, a voltage routing arrangement including four sets of cascade connected routing sets and four control stages controlling respectively the conditions of said four routing sets, an input circuit for applying an input voltage to the first of said routing sets and two output circuits coupled, respectively, one to the output of the third of said four routing sets and the other to the output of the second of said routing sets, means for also coupling said third routing set to said second output circuit; said latter coupling means being under control of the fourth of said routing sets; means for applying two number representative pulse trains to the respective inputs of the control stages of two of the first three routing sets in said cascaded arrangement; means for delaying and applying the output voltage from said other output circuit to the control stage of the remaining routing set of said first three routing sets; and means for applying an operational signal to the control stage of said fourth routing set.

7. System according to claim 6 wherein said signal applying means include means for applying a pulse lasting the complete time interval of the pulses applied to the control stages of said first three routing sets.

8. System according to claim 6 wherein each routing set includes double throw switching means for the first three stages and single throw switching means for the fourth stage, said double throw switching means selectively directing voltage applied at the input of first stage switching means over second and third stage switching means to a first output connected to switching means for the third stage and also to a second output connected to switching means for the second stage and said single throw switching means selectively directing said voltage from said third stage switching means to said second output according to the condition of said switching means for said fourth stage.

9. System according to claim 6 wherein each of said control stages includes means under control of their respective inputs, operable from a binary zero to a binary one condition in response to an input voltage and being operative in turn for actuating its routing set from an off-condition to an on-condition.

10. System according to claim 6 wherein each routing set includes electro-magnetic relay means; said relay means of the first two routing sets including armatures cooperating with pairs of off and on contacts, the relay means of the third routing set including both armatures cooperating with a pair of off and on contacts and cooperating with single contacts; and the relay means of the fourth routing set including armatures cooperating with single contacts; an armature of the first routing set receiving an arbitrary voltage, the on and off contacts of said armature being connected respectively to armatures of the second routing set, the on contact of the one of said second routing armatures which is connected to the off contact in the first routing armature and the off contact of the other of said second routing armatures which is connected to the on contact of the first routing armature being connected in common to the two-contact-armature of the third routing set whereas the other off and on contacts of the respective second routing armatures are respectively connected to single contact armatures of said third routing set cooperating with contacts connected in common to a first output terminal; a second output terminal to which there is connected the on contact of the second routing armature which is connected to the on contact of the first routing armature, said second output terminal being also connected to respective contacts of the fourth routing set, the armatures of said fourth set on and off contacts being respectively connected to the on and off contacts cooperating with the two-contact-armature of the third routing set.

11. System according to claim 10 wherein each of said control stages includes means operable from the binary zero condition to a binary one condition in response to an input binary one condition voltage, each of said control stages controlling the actuation of the armatures in each of said routing sets; said output delaying and applying means including a delayed feed-back connection from the second output terminal to the actuation input of the second control stage; and said signal applying means including means for applying an algebraic sign representative voltage on the actuation input of the fourth control stage during the complete time interval in which said incoming and delayed trains are applied on the inputs of the said first three control stages.

12. System according to claim 6 wherein each of said routing sets includes a crystal rectifier network, said networks being interconnected and said interconnections including a paralleled arrangement of electrical conductors, comprising a first group of four commoned conductors, two conductors of said first group being further connected in common to control a second group of three conductors which are also commoned, a third conductor of said first group being further connected to control a third group of two commoned conductors; a first common terminal to which there are connected the fourth conductor of the first group and one conductor of each of the two other groups of conductors, and a second common terminal to which there are connected the remaining three conductors of said two other groups.

13. System according to claim 12 wherein the first routing set comprises four crystal rectifiers branched off the first group of conductors and the second routing set also comprises four crystal rectifiers branched off said first group; said crystal rectifiers being connected by pairs in each routing set to a pair of actuation leads, each of the crystal rectifiers branched off the two commoned conductors of the first group and each of the rectifiers branched off the two other conductors of the first group, being connected to one actuation lead; and each actuation lead being connected to different conductor pairs; the third routing set comprises three crystal rectifiers connected to one of the pair of actuation leads of said routing set and two crystal rectifiers connected to the other of the pair of said actuation leads; the three crystal rectifiers in said third routing set being branched off respectively the singled conductor of the first group, the conductor of the third group which is connected to said first output terminal, and one of the conductors of the second group which is connected to the second output terminal; the two crystal rectifiers in said third routing set being respectively branched off the other two conductors of said second group; and the fourth routing set comprising a pair of crystal rectifiers connected, respectively, to a pair of actuation leads and branched off respectively the two conductors of the second group which are connected to said second output terminal.

14. System according to claim 13 comprising in each control stage a control unit operable from a binary zero condition to a binary one condition; each of said control units feeding a respective pair of said actuation leads and switching a ground potential from one of said leads to the other lead of the pair; a feed back circuit including a delay element and extending from the second output terminal to the actuation input of the second control unit, and said signal applying means including means for applying during the complete time interval in which said first three control units are receiving pulse trains, an algebraic sign representative voltage on the actuation input of the fourth stage control unit.

15. System according to claim 6 wherein each of said routing sets includes a crystal rectifier network, and each of said control stages includes a control unit operable from a binary zero to a binary one condition in response to a binary one representative voltage, a pair of output leads from each one of said control units, one lead of said pairs being at ground potential while the other is at an operative potential; there being also provided a first group of four commoned conductors; two of said first group being further connected in common to control a second group of three commoned conductors; and a third conductor of said first group being connected to a third group of two commoned conductors; an input terminal for applying an electric voltage to said first group of conductors; a first output terminal for said voltage to which there are connected the singled conductor of said first group, one of the conductors of said second group and one of the conductors of said third group; and a second output terminal for said voltage to which there are connected the remaining two conductors of said second group and the remaining conductor of said third group; three crystal rectifiers associated with three routing sets respectively, being branched off the singled conductor of said first group and being connected respectively to two operative potential leads and one group potential lead of three of said control units; two crystal rectifiers associated with the two first routing sets, respectively, being branched off the conductor of said first group connected to said third group and being connected to the ground potential leads of the first two of said control units; and two crystal rectifiers associated with said first two routing sets, respectively, being branched off another one of said first group of conductors and being connected respectively to a ground potential and to an operative potential lead of said first two control units; the connection for the one remaining conductor of said first group to one of said control units being different from the other of said control units, a crystal rectifier associated with the third routing set, being branched off the conductor of said second group which is connected to the first output terminal and being connected to the operative potential lead of the third of said control units, and another crystal rectifier associated with said third routing set, being also connected to said lead and being branched off one of the two conductors of said second group connected to said second output terminal; another crystal rectifier associated with the fourth routing set, being branched off one of the two conductors of said second group, connected to said second output terminal; another crystal rectifier associated with the fourth routing set, being branched off this latter conductor and connected to the ground potential lead of the fourth of said control units; a crystal rectifier associated with the third routing set, being branched off the other of the two conductors of said second group connected to said second output terminal, and being connected to the ground potential lead of the third control unit; a crystal rectifier associated with said fourth routing set, being connected to the operative potential lead of the fourth control unit and being branched off the remaining conductor of said second group, and a crystal rectifier associated with said third routing set, being connected to the ground potential lead from said third control unit and branched off the conductor of the third group which is connected to the first output terminal.

16. System according to claim 15 comprising a gating stage controlled by timing pulses and connected to said first output terminal, and a gating stage controlled by timing pulses and connected to said second output terminal.

17. System according to claim 15 wherein each of said control units comprises a vacuum tube including two triodes with a common grounded cathode, a positive bias on the triode the plate of which is brought to ground potential when no concrete pulses are applied to said unit, and a negative bias on the triode, the plate of which is brought to operative potential when no concrete pulses are applied to said unit; another vacuum tube having its plate connected to the control grid of the triode which is conductive at rest and its cathode connected to the control grid of the triode which is non-conductive at rest, and means for operating said control units including means for applying binary one incoming signals in positive polarity on the control grid of said other vacuum tube.

18. System according to claim 15 comprising two gating stages each having two electrodes both normally biased to cut off, one of said two electrodes in each gating stage under control of said first and second outputs respectively and the other of said two electrodes in each gating stage under the control of a common pulse frequency to permit unblocking of said gating stages only in the rhythm of said common frequency and under control of pulses derived from said outputs.

References Cited in the file of this patent

UNITED STATES PATENTS

| | | |
|---|---|---|
| 2,503,765 | Rajchman | Apr. 11, 1950 |
| 2,552,760 | Baker | May 15, 1951 |
| 2,590,950 | Eckert | Apr. 1, 1952 |
| 2,646,501 | Eckert | July 21, 1953 |
| 2,673,293 | Eckert | Mar. 23, 1954 |